(12) United States Patent
Li et al.

(10) Patent No.: US 9,434,497 B2
(45) Date of Patent: Sep. 6, 2016

(54) PEELING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bing Li, Shenzhen (CN); Bo Yang, Shenzhen (CN)

(73) Assignees: HONG FU JIN PRECISION (Shenzhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 51 days.

(21) Appl. No.: 14/496,708

(22) Filed: Sep. 25, 2014

(65) Prior Publication Data

US 2015/0151530 A1    Jun. 4, 2015

(30) Foreign Application Priority Data

Nov. 29, 2013    (CN) .......................... 2013 1 0619339

(51) Int. Cl.
| | |
|---|---|
| *B32B 38/10* | (2006.01) |
| *B65C 9/08* | (2006.01) |
| *B65C 9/00* | (2006.01) |
| *B32B 43/00* | (2006.01) |

(52) U.S. Cl.
CPC ........... *B65C 9/0006* (2013.01); *B32B 43/006* (2013.01); *B65C 2009/0009* (2013.01); *Y10T 156/1168* (2015.01); *Y10T 156/1195* (2015.01); *Y10T 156/19* (2015.01); *Y10T 156/1978* (2015.01); *Y10T 156/1994* (2015.01)

(58) Field of Classification Search
CPC ................ B32B 43/006; B32B 38/10; Y10T 156/1168; Y10T 156/1195; Y10T 156/1978; Y10T 156/1994
See application file for complete search history.

(56) References Cited

U.S. PATENT DOCUMENTS

| | | | |
|---|---|---|---|
| 5,482,899 A * | 1/1996 | McKenna | B28D 5/0082 156/716 |
| 6,932,136 B1 * | 8/2005 | Kelkar | H01L 21/67132 156/716 |
| 7,644,747 B2 * | 1/2010 | Ohkawara | H01L 21/67132 156/268 |
| 2014/0060752 A1 * | 3/2014 | Li | B65C 9/1865 156/767 |

* cited by examiner

*Primary Examiner* — Mark A Osele
(74) *Attorney, Agent, or Firm* — Zhigang Ma

(57) ABSTRACT

A label peeling device includes a mounting bracket, a power member attached to the mounting bracket, a driving member driven by the power member; and a pressing assembly coupled to a first end of the driving member. A clamping mechanism includes a sliding member coupled to a second end of the driving member, and a clamping assembly configured to clamp a backing paper. A first resisting member is attached to the mounting bracket, and presses against the clamping assembly. The pressing assembly and the clamping mechanism are configured to be urged toward each other by a driving force imparted by the power member, the first resisting member drive the clamping assembly to the sliding member, and thereby cause at least one of the plurality of wafers to be removed from the backing paper.

14 Claims, 4 Drawing Sheets

PEELING DEVICE

FIELD

The subject matter herein generally relates to manufacturing processes.

BACKGROUND

In industry process, the labels are peeled off from a tape-shaped backing paper by a peeling device. The labels are pasted on the backing paper in rows. The peeling device includes a peeling mechanism, a driving mechanism, and a detector. The peeling mechanism synchronously peels the labels in a row from the backing paper when being rotated by the driving mechanism. Each of the labels is partly peeled from the backing paper. The detector is parallel and staggered with the peeling mechanism. The detecting range of the detector is equal to the size of one label. When the peeled label directly facing the detector is being detected, the detector generates a pause signal. The driving mechanism stops rotating the peeling mechanism in response to the pause signal.

BRIEF DESCRIPTION OF THE DRAWINGS

Implementations of the present technology will now be described, by way of example only, with reference to the attached figures.

DETAILED DESCRIPTION

Figure 1:
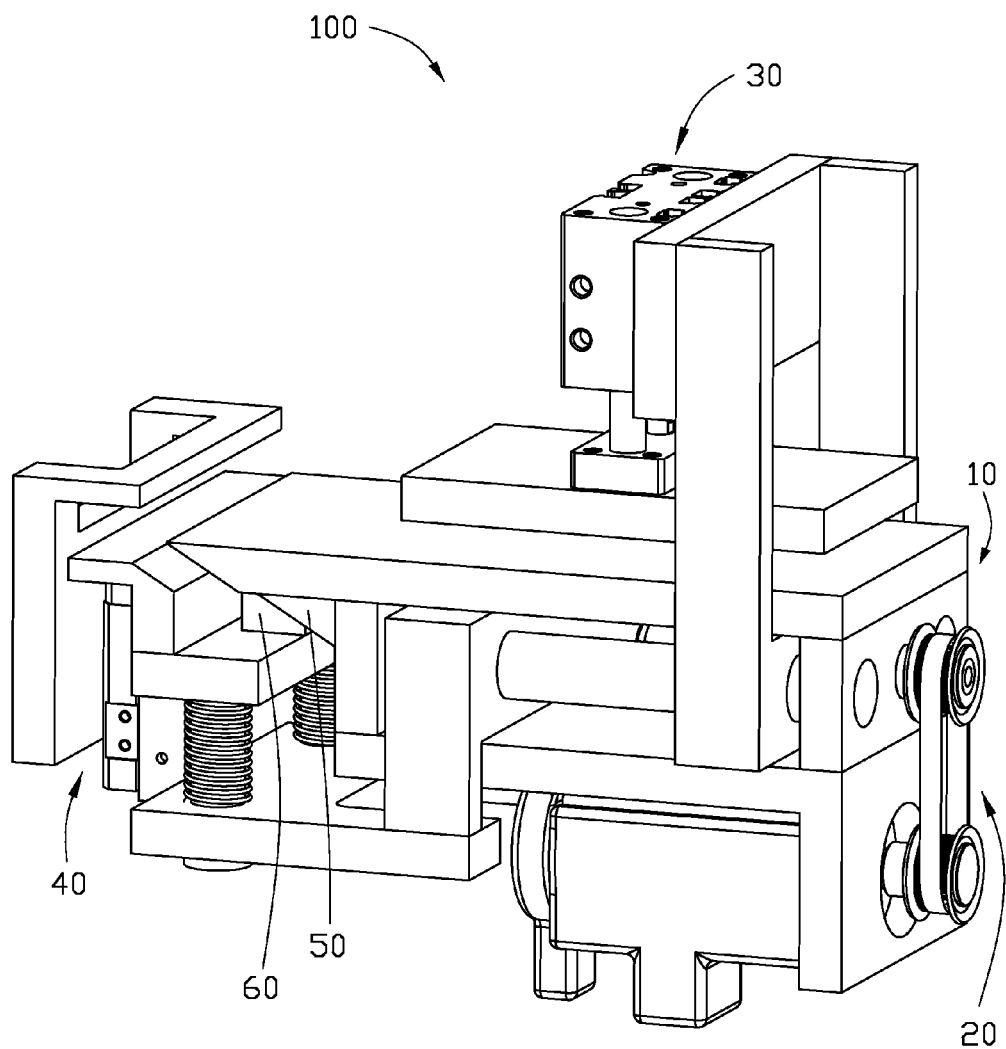
FIG. 1 is a isometric view of an embodiment of a peeling device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined as to be essentially conforming to the particular dimension, shape, or other feature that the term modifies, such that the component need not be exact. For example, "substantially cylindrical" means that the object resembles a cylinder, but can have one or more deviations from a true cylinder. The term "comprising", when utilized, means "including, but not necessarily limited to"; it specifically indicates open-ended inclusion or membership in the so-described combination, group, series, and the like.

The present disclosure is described in relation to a peeling device.

FIG. 1 illustrates an embodiment of a peeling device. The peeling device can peel off wafers 300 from a backing paper 200 (see FIG. 4), and includes a fixing assembly 10, a driving assembly 20, a pressing assembly 30; a clamping mechanism 40, a first resisting member 50, and a second resisting member 60. The driving assembly 20 can be assembled to the fixing assembly 10. The pressing assembly 30 and the clamping mechanism 40 can be slidably assembled to the fixing assembly 10. The second resisting member 60 can be attached to the clamping mechanism 40, and be coupled to the first resisting member 50. When the pressing assembly 30 and the clamping mechanism 40 move toward each other, the first resisting member 50 can press against the second resisting member 60 and drive the clamping mechanism 40 to move down. Therefore, parts of wafers 300 can be peeled off the backing paper 200.

Figure 2:
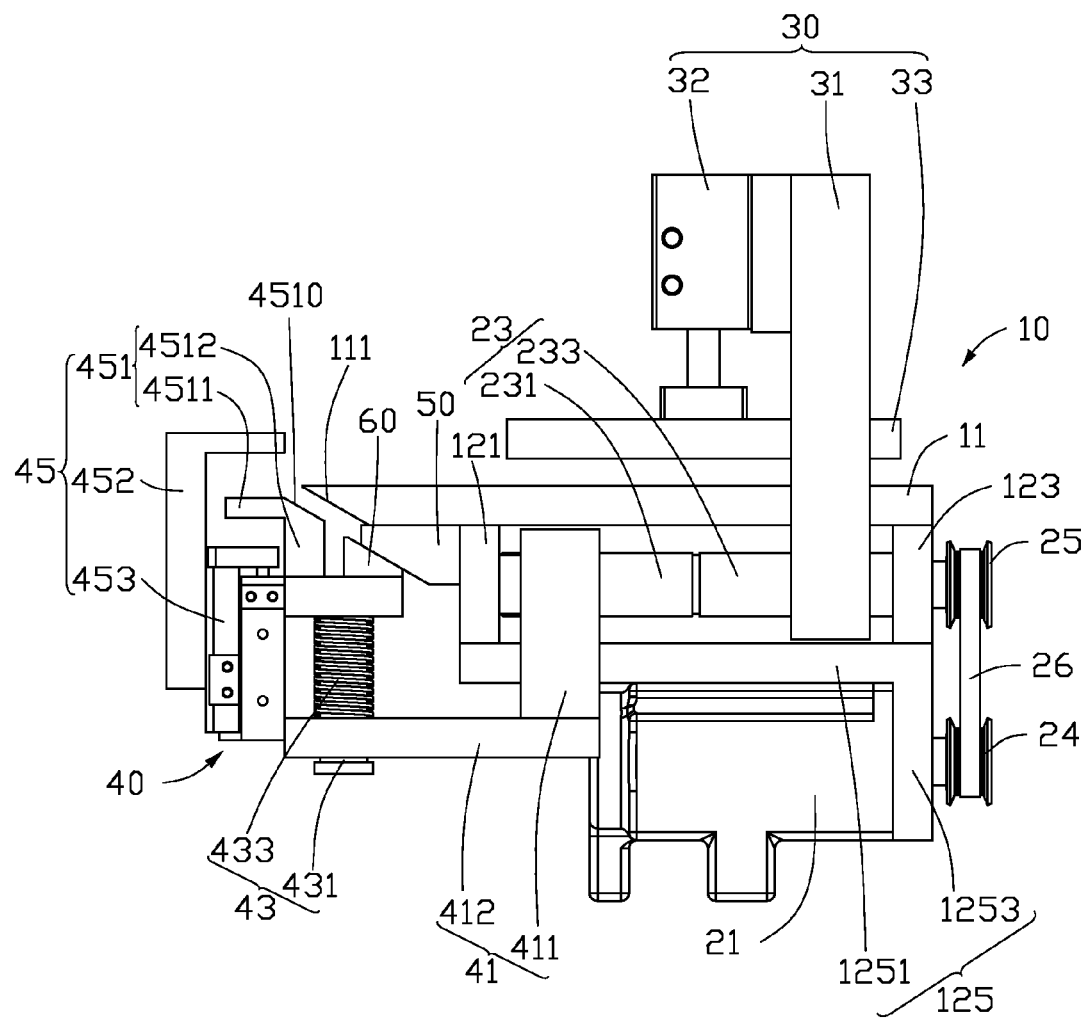
FIG. 2 is a side elevational view of the peeling device of FIG. 1.

FIG. 2 illustrates a side elevational view of the peeling device. The fixing assembly 10 can include a supporting member 11 and a mounting bracket 12 (see FIG. 3). The supporting member 11 can be configured to support the backing paper 200 having a plurality of wafers 300 thereon, and a first bevel 111 can be defined at the end of the supporting member 11. The mounting bracket 12 can include a first mounting member 121, a second mounting member 123, and a third mounting member 125. The first mounting member 121 and the second mounting member 123 can be parallelly connected to the supporting member 11, and the first mounting member 121 can be adjacent to the first bevel 111. The third mounting member 125 can include a first mounting portion 1251 and a second mounting portion 1253. The first mounting member 121 and the second mounting member 123 can be connected by the first mounting portion 1251. The second mounting portion 1253 can vertically extend from the first mounting portion 1251.

The clamping mechanism 40 can include a sliding member 41, two movable members 43, and a clamping assembly 45. In at least one embodiment, the number of movable members 43 can be only one. The sliding member 41 can include a sliding portion 411 and an assembling portion 412. Each movable member 43 can include a supporting pole 431 and an elastic member 433 surrounding the supporting pole 431. One end of the supporting pole 431 can be slidably connected to the assembling portion 412, and the other end of the supporting pole 431 can be connected to the clamping assembly 45. The elastic member 433 can be clamped between the assembling portion 412 and the clamping assembly 45. The clamping assembly 45 can include a first clamping member 451, a second clamping member 452, and a first pushing member 453. The first clamping member 451 can include a clamping portion 4511 and a supporting portion 4512. The supporting portion 4512 can be attached to the other end of the supporting pole 431, and resist against the elastic member 433. The supporting portion 4512 can be substantially L-shaped. The supporting portion 4512 can define a second bevel 4510 coupled to the first bevel 111, with a certain and appropriate distance between the second bevel 4510 and the first bevel 111. The clamping portion 4511 can be substantially a plate, and connected to supporting portion 4512. The first pushing member 453 can be assembled to the supporting portion 4512. The second clamping member 452 can be coupled to the first clamping member 451, and connected to the first pushing member 453. The first pushing member 453 can drive the second clamping member 452 to move toward the first clamping member 451, and the backing paper 200 can be clamped between the first clamping member 451 and the second clamping member 452.

Figure 3:
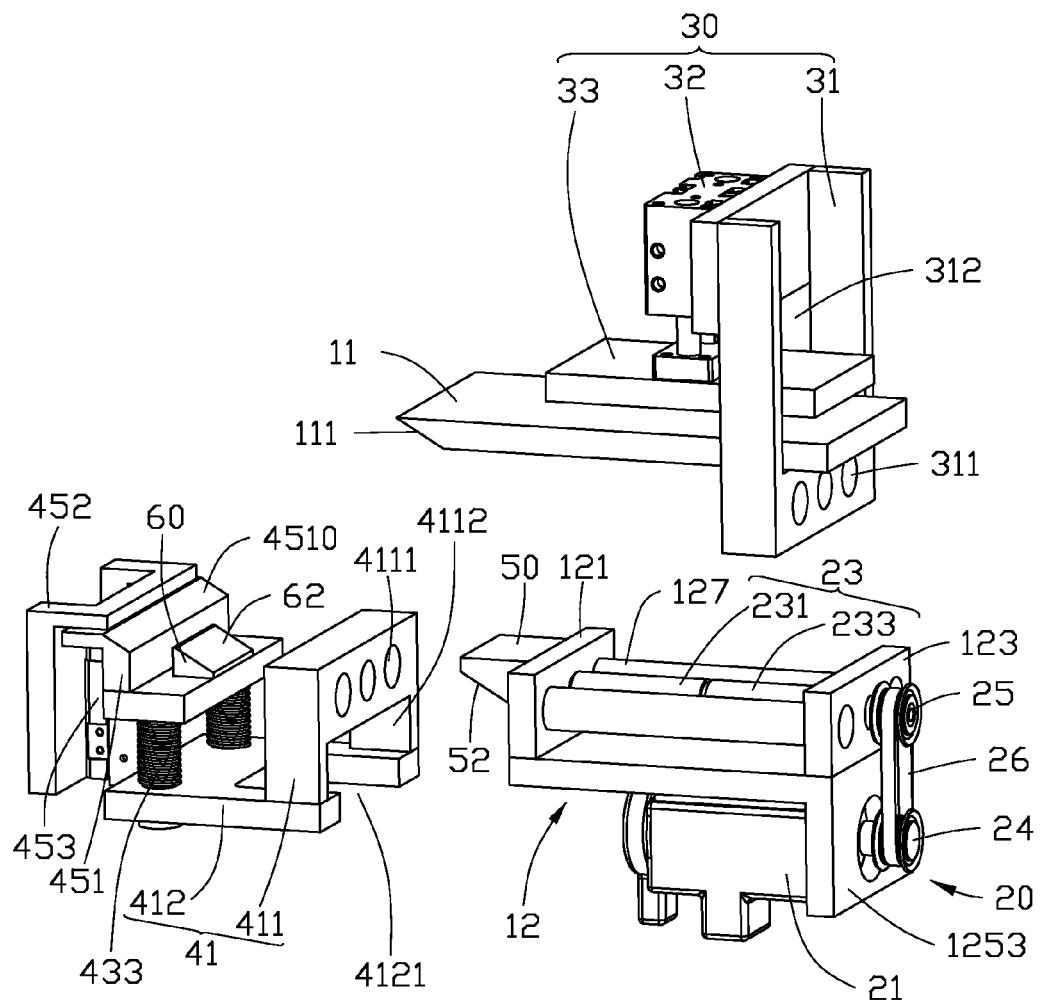
FIG. 3 is an exploded, isometric view of the peeling device of FIG. 1.

FIG. 3 is an exploded, isometric view of the peeling device. The fixing assembly 10 can further include two guiding members 127, and each guiding member 127 can be substantially cylindrical. Each of the two guiding members 127 can be connected between the first mounting member 121 and the second mounting member 123.

The driving assembly 20 can be assembled to the mounting bracket 12, and can include a power member 21, a driving member 23, a drive wheel 24; a slave wheel 25, and a conveyor belt 26. The power member 21 can be attached to the second mounting portion 1253, the pressing assembly (30) and the clamping mechanism (40) can be configured to be urged toward each other by a driving force imparted by the power member (21). The drive wheel 24 can be assembled to the power member 21, and can be driven by the power member 21. The driving member 23 can be substantially cylindrical. The driving member 23 can be parallel to each guiding member 127, and positioned between the two guiding members 127. In at least one embodiment, the two guiding members 127 can be omitted, and the driving member 23 can function as a guiding member. The driving member 23 can include a first portion 231 and a second portion 233 coupled to the first portion 231. The first portion 231 can be rotatably connected to the first mounting member 121, and the second portion 233 can also be rotatably connected to the second mounting member 123. The second portion 233 can pass through the second mounting member 123, and be connected to the slave wheel 25. The conveyor belt 26 can be wrapped around the drive wheel 24 and the slave wheel 25, thereby the slave wheel 25 can be driven by the drive wheel 24. In the illustrated embodiment, the first portion 231 cannot be connected to the second portion 233, and sidewalls of the first portion 231 and the second portion 233 can both have threads, but a threaded direction of the first portion 231 can be opposite to a threaded direction of the second portion 233.

In at least one embodiment, the conveyor belt 26 can be omitted, and the drive wheel 24 can be directly coupled to the slave wheel 25. Also, the third mounting member 125, the drive wheel 24, and the slave wheel 25 can all be omitted, the power member 21 being directly connected to the driving member 23.

The pressing assembly 30 can be assembled to the guiding members 127 and the second portion 233 of the driving member 23, and can include a moving member 31, a first pushing member 32, and a pressing member 33. The moving member 31 can be substantially a plate, and include a plurality of first through holes 311. The guiding members 127 and the second portion 233 of the driving member 23 can be coupled to pass through the through holes 311. A U-shaped opening 312 can be defined on the moving member 31. The supporting member 11 can pass through the opening 312, and connect to the second mounting member 123. The first pushing member 32 can be attached to the moving member 31, away from the supporting member 11. The pressing member 33 can be connected to the first pushing member 32 adjacent to the supporting member 11. The first pushing member 32 can drive the pressing member 33 to move toward the supporting member 11, and the backing paper 200 and the wafers 300 can be firmly clamped between the supporting member 11 and the pressing member 33.

A second through hole 4111 can be defined on the sliding portion 411, and the guiding members 127 and the first portion 231 of the driving member 23 can be coupled to pass through the second through holes 4111. A receiving portion 4112 can be defined on the sliding portion 411, and configured to receive the first mounting portion 1251. The assembling portion 412 can be attached to the sliding portion 411, and can be adjacent to the receiving portion 4112. The assembling portion 412 can include a groove 4121 coupled to the receiving portion 4112. The power member 21 can be received in the groove 4121, so the power member 21 has no effect on the moving of the clamping mechanism 41.

The first resisting member 50 can be attached to the first mounting member 121, far away from the second mounting member 123. The cross section of the first resisting member 50 can be substantially trapezoid, and the resisting member 50 can define a third bevel 52. The second resisting member 60 can be attached to the supporting portion 4512 of the first clamping member 451, and resist against the first resisting member 50. The second resisting member 60 can define a fourth bevel 62 coupled to the third bevel 52. In at least one embodiment, the second resisting member 60 can be integrated with the first clamping member 451.

Figure 4:
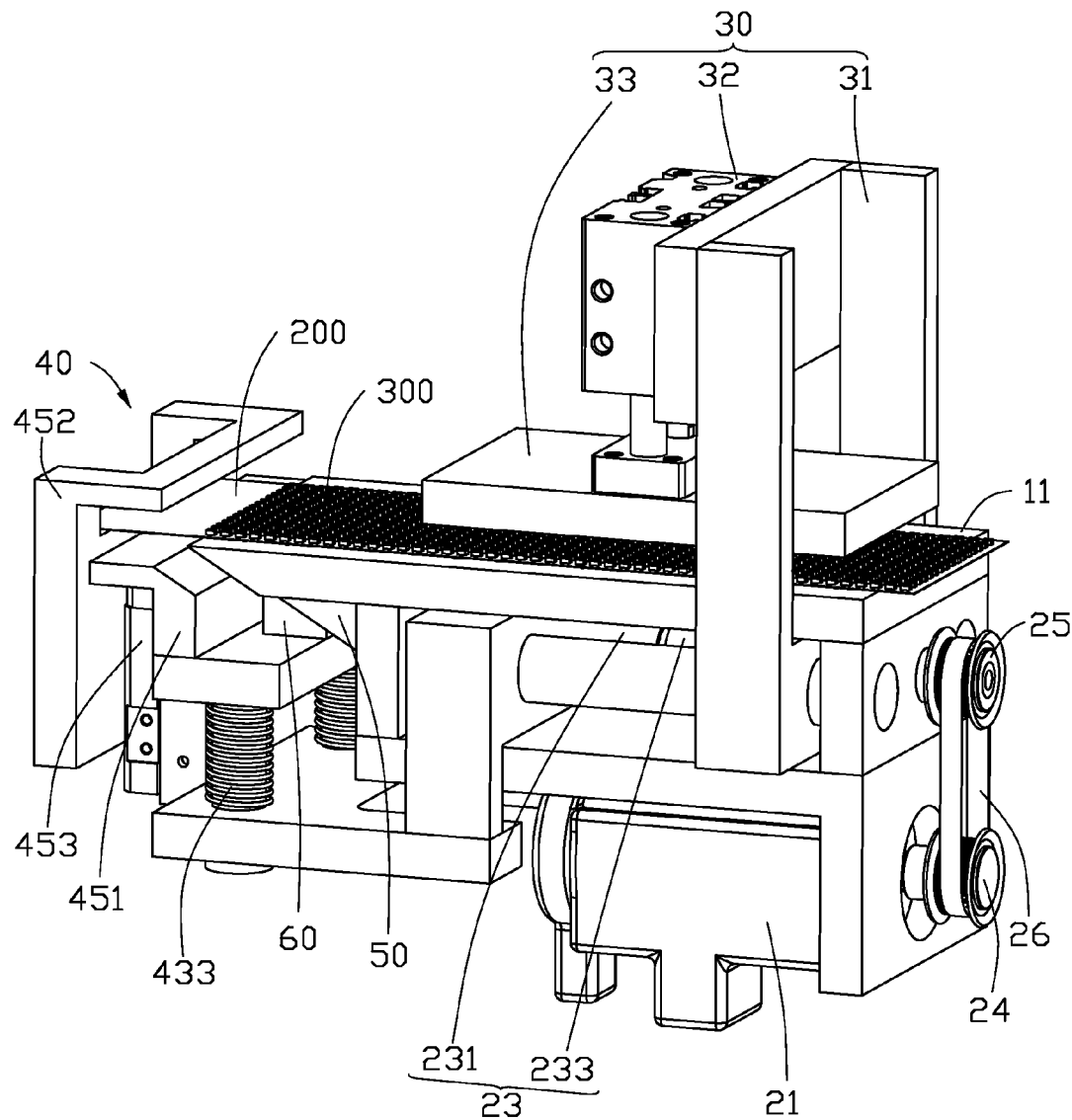
FIG. 4 is an isometric view of the peeling device of FIG. 1 in a working state.

FIG. 4 illustrates the peeling device in a working state. In operation, the backing paper 200 having a plurality of wafers 300 thereon can be positioned on the supporting member 11. One end of the backing paper 200 can be clamped between the first clamping member 451 and the second clamping member 452, and the other end of the backing paper 200 can be clamped between the supporting member 11 and the pressing member 33. The first portion 231 and the second portion 233 can rotate along opposite directions, by the driving of the power member 21. The pressing assembly 30 and the clamping mechanism 40 can move toward each other. Then the first resisting member 50 can resist against the second resisting member 60. The first clamping member 451 can move toward the sliding member 41, and the elastic member 433 can be compressed. Meanwhile the wafers 300 adjacent to the first bevel 111 can be peeled off the backing paper 200 (see FIG. 3).

After the wafers 300 adjacent to the first bevel 111 have been peeled off from the backing paper 200, the second clamping member 452 can be separated from the first clamping member 451 by the driving of the second pushing member 453. Meanwhile the end of the backing paper 200 can be freed from the clamping assembly 45. Then the end of the backing paper 200 can again be clamped between the first clamping member 451 and the second clamping member 452, and the pressing member 33 can be separated from the supporting member 11 by the driving of the first pushing member 32. The pressing assembly 30 and the clamping mechanism 40 can move away from each other. When the next wafers 300 are adjacent to the first bevel 111, the pressing member 33 can descend and press on the backing paper 200. Then the next wafer 300 can be removed from the backing paper 200 in the same way as the former wafer 300 (see FIG. 3).

The embodiments shown and described above are only examples. Many details are often found in the art such as the other features of a peeling device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A peeling device comprising:
   a mounting bracket;
   a supporting member attached to the mounting bracket and configured to support a backing paper having a plurality of wafers thereon;
   a power member attached to the mounting bracket;
   a driving member coupled to the mounting bracket and connected to the power member;
   a pressing assembly coupled to a first end of the driving member;
   a clamping mechanism comprising:
      a sliding member coupled to a second end of the driving member,
      a clamping assembly configured to clamp the backing paper, and
      a movable member connecting the sliding member with the clamping assembly; and
   a first resisting member attached to the mounting bracket, the first resisting member configured to press against the clamping assembly;
   wherein the pressing assembly and the clamping mechanism are configured to be urged toward each other by a driving force imparted by the power member, the first resisting member is configured to drive the clamping assembly to move toward the sliding member, and thereby cause at least one of the plurality of wafers to be removed from the backing paper.

2. The peeling device as claimed in claim 1, wherein the sliding member comprises a sliding portion and an assembling portion, the movable member comprises a supporting pole and an elastic member surrounding the supporting pole, the supporting pole is slidably connected to the assembling portion, the elastic member is clamped between the assembling portion and the clamping assembly.

3. The peeling device as claimed in claim 1, wherein the clamping assembly comprises a first clamping member, a second clamping member coupled to the first clamping member, and a first pushing member connected to the second clamping member.

4. The peeling device as claimed in claim 3, wherein the first pushing member drive the second clamping member to move toward the first clamping member, and the backing paper is clamped between the first clamping member and the second clamping member.

5. The peeling device as claimed in claim 3, wherein a first bevel is defined at the end of the supporting member, the first clamping member comprises a clamping portion and a supporting portion, the supporting portion defines a second bevel coupled to the first bevel, and an appropriate distance is formed between the second bevel and the first bevel.

6. The peeling device as claimed in claim 5, wherein the peeling device further comprises a second resisting member attached to the supporting portion of the first clamping member, the resisting member defines a third bevel, and the second resisting member defines a fourth bevel coupled to the third bevel.

7. The peeling device as claimed in claim 1, wherein the pressing assembly comprises a moving member, the moving member comprises a plurality of first through holes, and the driving member is coupled to pass through the through holes.

8. The peeling device as claimed in claim 7, wherein the pressing assembly further comprises a first pushing member attached to the moving member and a pressing member, the pressing member is connected to the first pushing member, and adjacent to the supporting member.

9. The peeling device as claimed in claim 8, wherein the first pushing member drives the pressing member to move toward the supporting member, and the backing paper is firmly clamped between the supporting member and the pressing member.

10. The peeling device as claimed in claim 1, wherein the mounting bracket comprises a first mounting member and a second mounting member, and the first mounting member and the second mounting member are parallelly connected to the supporting member.

11. The peeling device as claimed in claim 10, wherein the mounting bracket further comprises a third mounting member, the third mounting member comprises a first mounting portion and a second mounting portion, the second mounting portion vertically extend from the first mounting portion, and the first mounting member and the second mounting member are connected by the first mounting portion.

12. The peeling device as claimed in claim 10, wherein the fixing assembly further comprises two guiding members, and each guiding member is connected between the first mounting member and the second mounting member.

13. The peeling device as claimed in claim 10, wherein the driving member comprises a first portion and a second portion coupled to the first portion, the first portion is rotatably connected to the first mounting member, and the second portion is rotatably connected to the second mounting member.

14. The peeling device as claimed in claim 13, wherein the driving assembly further comprises a drive wheel, a slave wheel, and a conveyor belt, the drive wheel is assembled to the power member and driven by the power member, the second portion of the driving member is connected to the slave wheel, and the conveyor belt is wrapped around the drive wheel and the slave wheel.

* * * * *